April 21, 1942.                A. G. KANDOIAN                        2,280,514
                          SINGLE LINE GUIDING BEACON
                          Filed Jan. 31, 1940              2 Sheets-Sheet 1
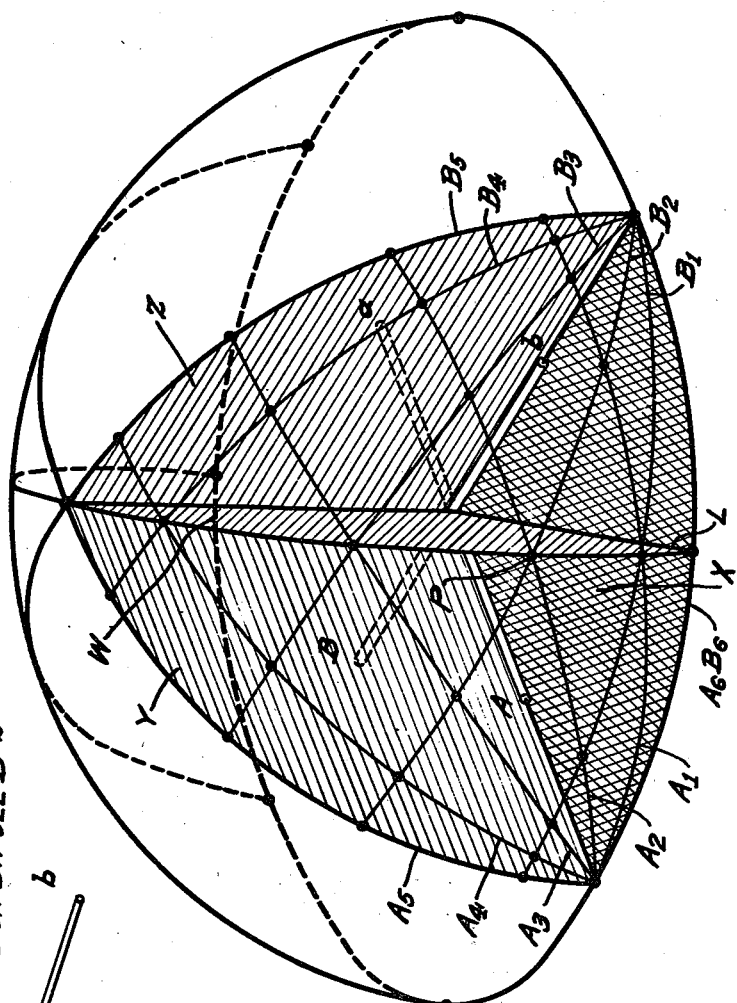
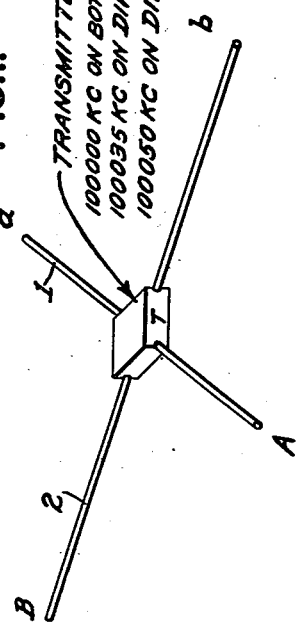
INVENTOR.
ARMIG G. KANDOIAN
BY
RCHopgood
ATTORNEY.

Patented Apr. 21, 1942

2,280,514

UNITED STATES PATENT OFFICE 2,280,514

SINGLE LINE GUIDING BEACON

Armig G. Kandoian, New York, N. Y., assignor to International Telephone Development Co., Inc., New York, N. Y., a corporation of Delaware Application January 31, 1940, Serial No. 316,497

7 Claims. (Cl. 250—11)

My invention relates to radio beacon systems and more particularly to a radio beacon system utilizing a single pair of antennae to provide a single straight line guiding path.

Radio beacon systems wherein a single straight line guiding path is defined have been produced. These known systems generally utilize three or more radiators for a single transmitter displaced in three or more positions so that the fields intersect to produce a common line along which the amplitude of the signals may be compared so as to define a guide path.

According to my invention I provide a single line guide path by utilizing radiation of two fields which are polarized in different directions and which are energized with a predetermined phase displacement so that a single guide line toward the beacon is provided. Thus, an airplane flying along the path toward the beacon may follow a point wherein no signals are received, the signals being cancelled in one direction because of the direction of polarization and in an intersecting plane by 180° phase displacement of the received signals.

While a beacon, as described above, will provide a course indication and will also furnish an indication when the plane departs from this course, it will not alone serve to indicate the direction of departure from the course. To provide for this contingency, a further feature of my invention comprises the application of the separate radiators to distinctive modulation signals so that the pilot may be informed of the direction of departure from the beacon line.

In accordance with the above features, it is a principal object of my invention to provide a radio beacon system utilizing polarization of waves and phase displacement thereof to define a single guide course line.

It is a further object of my invention to provide a beacon of this type wherein a desired sharpness of course may be achieved.

It is a further object of my invention to provide a radio beacon system utilizing polarization and phase displacement to define a course line and to impart to the radiated waves different distinctive signals so that departure from the course laterally or vertically may be ascertained.

It is a still further object of my invention to provide a receiver for use with a radio beacon in accordance with my invention for distinguishing the signal indications.

Figure 4:
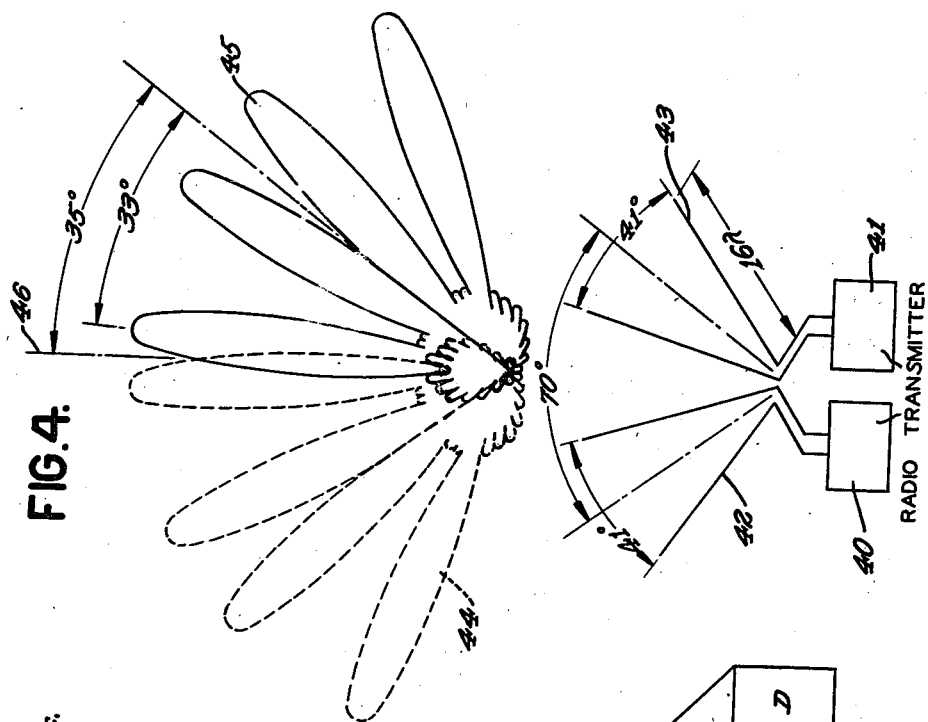
Figure 3:
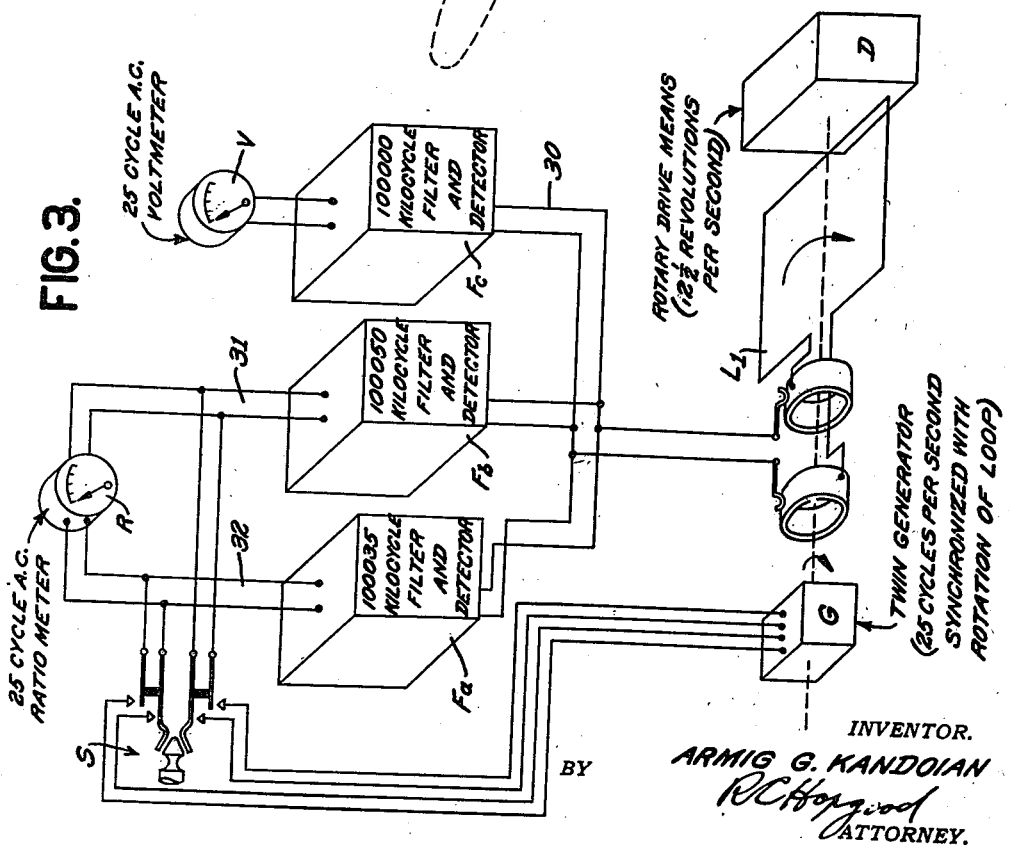

Further objects and advantages of my invention will be apparent from a particular description thereof made in connection with the accompanying drawings, wherein Fig. 1 diagrammatically illustrates one form of beacon transmitter suitable for use as a beacon, Fig. 2 is a diagram of the polar wave distribution for the purposes of explaining operation of my invention, Fig. 3 is a receiver arrangement for receiving and producing guiding course indications from a beacon made in accordance with my invention, and Fig. 4 is a modified form of radio beacon utilizing V antennae as the polarizing radiators.

Turning now to Fig. 1, 1 and 2 designate dipole antennae of equal length, the outer ends of which are designated A, $a$, B, $b$, respectively. Connected to these antennae is a transmitter T. Preferably the transmitter T is provided with a carrier frequency, for example, 100,000 kc. modulated with distinctive signal modulations, for example, 35 kc. on dipole 1 and 50 kc. on dipole 2. Transmitter T is connected so that the carrier frequency of a predetermined amplitude is supplied to dipoles 1 and 2 with 180° phase displacement between the ends A and $b$ of these dipoles. Thus, the energy radiated so far as the amplitude thereof is concerned, will be such that in a line midway between the dipole ends A and $b$ the carrier frequency will cancel because of the 180° phasing.

Also, the dipoles as so arranged will produce in the plane containing these dipoles a radiation wherein the polarizations of both signals are equal. Accordingly, the intersection of the plane of zero signals with the plane of equal polarization will produce a single line along which no signals from the transmitter may be received. This can be more clearly understood by a reference to Fig. 2. In this figure dipoles A, $a$, B, $b$, are shown arranged at right angles to one another. It is clear that with any dipole such as A, $a$, the electric waves travel out radially from the radiator with a finite velocity. At every point along the direction of propagation of these waves there is an electric intensity vector E and a magnetic intensity vector H, which vectors are mutually perpendicular.

In the hemisphere shown in Fig. 2 the direction of the electric vector E which determines the polarization follows along meridian lines $A_1$, $A_2$, $A_3$, $A_4$ and $A_5$ for dipole A, $a$ and along meridian lines $B_1$, $B_2$, $B_3$, $B_4$ and $B_5$ for dipole B, $b$, as well as along line $A_6$, $B_6$, which forms a common meridian for both the dipoles. In the shaded portion of Fig. 2, three quadrant planes X, Y and Z are illustrated, these planes being separately shaded. A consideration of this figure and the meridian lines clearly shows that only in plane X, which is the plane containing both of the dipoles is the polarization direction of both of the radiations the same. At all other points the difference in polarization may be readily seen to constitute the angular relation between meridians $A_1$ to $A_5$ and $B_1$ to $B_5$, as shown in the figure. Accordingly, it is clear that a single plane of polarization is provided when two mutually perpendicular dipoles are arranged in the same plane.

It is clear, however, that the same fact holds true regardless of whether the antennae are perpendicular one to another so long as they are both in the same plane. In fact, the sharpness of the indication in so far as the polarization is concerned may be increased by making the angle between radiators acute instead of a 90° angle as shown. This is evident when the effect of the meridians associated with the various antennae is considered. For example, if radiator A, $a$, was moved to the right in Fig. 2 about its axis it can be seen that the various meridians $A_1$, $B_1$, $A_2$, $B_2$, etc., would meet at a sharper angle indicating a greater degree of departure from equality of polarization.

It can, therefore, be seen that two radiators arranged in the same plane and polarized in different directions will have a single plane wherein the polarization from the two antennae is equal. However, since antennae A, $a$, B, $b$, are energized in proper phase a further plane may be defined. This plane is illustrated in Fig. 2 at W and constitutes a plane bisecting the angle between radiators A, $a$, B, $b$. This plane W intersects plane X along a line L which constitutes a single guiding line. If a receiver is moved along line L, no signals will be received in the receiver because of the 180° phase difference of the radiation from the antennae. However, if the receiver is displaced in plane X on either side of line L, then signals will be received since the antenna is no longer in the field where phase opposition occurs. Similarly, if the radiator is raised above or dropped below plane X, then a certain signal will be obtained since the antenna will not be polarized so as to receive equally signals by polarizations. At any point, such as point P above the plane X, it can be seen that a considerable angular displacement occurs between the meridian $A_2$, $B_2$. Consequently, if the antenna is such that signals polarized along line $A_2$ are received most strongly, then there will no longer be a complete cancellation of signals, since the effective amplitude of the received signals will no longer be equal even though the phase relationship is still 180°. Since the departure from equality of polarization varies at all points along plane W, it is clear that any antenna which is capable of receiving polarized waves can produce a zero signal along line L only.

It is clear, therefore, that an antenna arrangement such as shown in Fig. 1, wherein the dipoles 1 and 2 are arranged in the same plane and are energized in phase opposition will produce a single line beacon course. This arrangement, of course, provides another single line course in the oppositely directed quadrant of the antennae. The dipoles 1 and 2 may be arranged at an angle with respect to the ground if desired so that the plane of polarization will constitute a guiding surface properly related for the purpose of landing an aircraft. Simultaneously a lateral guidance of the aircraft can be obtained by the phase opposition of the signals along the vertical plane, such as plane W.

Furthermore, if desired, the antennae A and B may be arranged in a single vertical plane so that the plane of equal polarization is a vertical plane. In this case the signal equality due to the opposition of the phasing of the energy will be at an angle bisecting the angle between the radiators. With such a system it is desirable that a pilot be provided with a compass, so that he can ascertain his general approach to the beacon so as to know what course to follow into a landing.

In Fig. 3 is illustrated a receiver for producing the guide course indication from a beacon of the type shown in Fig. 1 or any similar beacon wherein polarization phenomenon is utilized. This receiver comprises a loop $L_1$ which is continuously driven by a driving means designated generally at D. Loop $L_1$ is arranged so that it rotates about an axis parallel to the plane of equality of polarization of the beacon antenna when the moving vehicle is properly headed. The axis of the loop is made parallel with the normal line of travel of the vehicle. In the specific example illustrated, the loop is driven at 12½ revolutions per second so that the resultant envelope frequency produced by rotation of the loop will be 25 cycles per second. The output of loop $L_1$ may be carried over slip rings and a line 30 to a receiver $F_c$ which will receive the carrier frequency 1000 kc. in the particular example, and will detect this carrier frequency so as to produce an output having a 25 cycle envelope frequency. This 25 cycle output may be applied to a voltmeter V. Thus the pilot will be able to ascertain by use of the voltmeter any departure from the line defined by the beacon. When the craft is directly on course there will be a complete cancellation of energy and the voltmeter will remain at zero deflection. However, any deviation from the course will cause inequality of amplitude or polarization causing the voltmeter to register.

The voltmeter V, preferably constitutes a rectifier and a direct current voltmeter instead of an A. C. voltmeter as shown in the drawings. It is clear that a simple receiving structure such as shown in Fig. 3 using only the loop, the receiver $F_c$ and the voltmeter V may be utilized for indicating the departure from the course of the craft. However, such a system is subject to the defect that if the pilot is off course he cannot ascertain his direction of departure therefrom. It is, therefore, preferable to supply distinguishing modulation frequencies to the energy transmitted from the separate dipoles. This arrangement is also shown in Fig. 3.

Signal energy from loop $L_1$ is then transmitted over line 30 to separate filter and conductor arrangements $F_a$ and $F_b$. These arrangements are designed so as to pass only two side band frequencies, 1035 kc. and 1500 kc. in the particular example. The output of these two filters and detectors will then be an envelope frequency of 25 cycles due to the rotation of loop $L_1$. These two output envelopes may then be applied to the coils of a ratio meter R. Though meter R has been shown only as a 25 cycle meter it should be understood that this meter may incorporate rectifiers for producing D. C. proportional to the envelope amplitudes and a separate D. C. meter. Should the craft then depart on either side of the plane of cancellation the pointer will be deflected either to the right or to the left so as to indicate the direction and degree of departure. Thus, the pilot will be supplied with a meter indicating that he is in the line W. Any departure above or below line L may then be noted by reading meter V which will then show a reading.

However, it is desirable that the pilot be given an indication not only of his position with respect to plane W but with respect to plane X. In order to provide this indication a generator G which is driven in timed relation with respect to loop $L_1$ is supplied. This generator G produces a 25 cycle output which is properly synchronized with the rotation of loop $L_1$. The output of this generator is carried over separate lines to a switching arrangement S connected over contacts to lines 31, 32 to ratio meter R.

As the pilot flies along the course with meter R in its central position he may desire to ascertain his position vertically with respect to plane X. By pressing the key to switch S energy from the generator G is superposed upon the output energy $F_a$, $F_b$. Should the pilot be above plane X at this time then the phase of the energy from G will not coincide with the energy supplied from the output of the loop and the pointer will be deflected one direction or the other. Should he be below the plane X at this time the pointer R will be deflected in the opposite direction. Accordingly, by pressing the button of switch S periodically the pilot can check his position relative to the plane X as well as to the plane W. It is clear, also that if the plane is not exactly in the plane W at the time the switch S is closed, the pointer will already have an initial displacement from its central position. In this event the closing of switch S will operate to move the needle either further in the direction of displacement or back toward zero dependent upon the location of the receiver with respect to plane X.

It is manifest that while all of these modifications have been shown in a single receiver in the preferred form, it is clear that certain elements may be eliminated without destroying the usefulness of the receiver. For example, as pointed out previously, the generator G together with both receiver and filter arrangements $F_a$ and $F_b$ may be eliminated and only the voltmeter utilized. Similarly, the entire system except the generator G and switch arrangement S may be utilized or the system may be used without the receiving arrangement $F_c$ and voltmeter V. Furthermore, instead of a loop antenna $L_1$, other forms of directional antennae may be utilized as the rotatable antenna element. As pointed out in the above discussion the antennae of the radio beacon may be arranged in different angular relationship dependent upon the sharpness desired. Also, other forms of radiators and dipoles may be utilized if desired.

In Fig. 4 is shown an arrangement utilizing two V antennae for the beacon transmitter instead of dipoles. In this system two transmitters 40 and 41 carrying the same frequency are connected to V antennae 42, 43, respectively with such phase relation as to radiate fields opposed in phase. These antennae are so placed that the angle between the sides of each antenna is 41° and the angular distance between the bisector of each antenna arrangement is 70°. The radiators of each of the antenna is made 16 wavelengths long. The two radiators will then produce radiation patterns substantially as shown in dotted and solid lines, respectively, at 44, 45. It is clear that with these antenna the plane of polarization thereof will be in planes of the antenna and will be substantially the same as that radiated from a dipole connecting together the extreme ends of each of the antenna. Accordingly, the sharpness of the polarization pattern will be somewhat less than that produced by right angularly related dipoles since the effective angle between the antenna and dipole radiators is substantially 110°. However, this departure from 90° relationship will not produce any great decrease in the sharpness of this indication. The radiation pattern of the antennae along line 46, however, is very sharp due to the fact that the directive patterns are very steep sided at this point. Accordingly, a beacon formed of antenna arrangements such as shown in Fig. 4 will be highly directive in the lateral guiding plane and less sharply directive in the vertical sharpening plane.

It is clear that other forms of directive antennae may be utilized having different effective angular relationship for producing the desired sharpness of course either in the vertical plane, the horizontal plane or both.

While I have described my invention in conjunction with certain specific preferred embodiments thereof, it is clear that these showings are made only by way of example. What I consider to be my invention and desire to obtain protection thereon is embodied in the accompanying claims.

What I claim is:

1. A radio system comprising a beacon transmitter for producing a single straight line guide signal including a pair of radiators arranged in the same plane but with non-parallel axes, means for energizing said radiators so that associated ends of said radiators are substantially in phase opposition with respect to each other, and means for imparting distinctive modulation to energy from said radiators, and a receiver for receiving signals from said beacon comprising means for receiving signals from each of said radiators, means for separating according to said distinctive modulations and detecting said signals, indicator means responsive to said detected signals for producing indication of position in one direction with respect to said beacon, and means for selectively applying to said indicator a locally generated voltage to produce an indication of position in another direction with respect to said beacon.

2. A radio beacon according to claim 1 wherein said means for receiving signals from said beacon comprises a loop antenna and means for continuously rotating said antenna at a predetermined speed.

3. A radio beacon according to claim 1 wherein said means for receiving signals from said beacon comprises a loop antenna and means for continuously rotating said antenna at a predetermined speed, and said last named means comprises a generator driven in timed relation with said loop and a switch for applying voltage from said generator to said indicator means.

4. A radio receiver for receiving differently modulated beacon signal indications comprising a loop antenna, means for continuously rotating said antenna at a predetermined speed, means for separating said differently modulated signals and detecting them to produce two output envelopes having a frequency dependent upon the speed of rotation of said loop, and a meter connected in the output circuit of said separating means responsive to the envelope frequency energy for indicating departure of said receiver from a predetermined course.

5. A radio receiver according to claim 4, further comprising a generator operated in timed relation with the rotation of said loop for generating energy at the frequency of said envelope frequency, and means for selectively applying said generated energy to said meter to indicate a different sense of departure from said predetermined course.

6. A radio receiver according to claim 4, further comprising a receiving filter for passing only the unmodulated carrier frequency, means for detecting said unmodulated carrier, and a second meter connected to said detecting means and responsive to said detected carrier.

7. The method of guiding an aircraft which comprises producing two overlapping radiation patterns extending over a plane in phase opposition to one another, and having a common plane of polarization substantially intersecting said first named plane, receiving energy from said two patterns, comparing the received energy from said two patterns to determine said first plane, comparing polarization of the received signals to determine said second named plane, and guiding said craft along the line determined by the intersection of said planes.

ARMIG G. KANDOIAN.